(12) United States Patent
Fujii et al.

(10) Patent No.: US 7,780,751 B2
(45) Date of Patent: Aug. 24, 2010

(54) POLISHING COMPOSITION FOR HARD DISK SUBSTRATE

(75) Inventors: Shigeo Fujii, Wakayama (JP); Kenichi Suenaga, Wakayama (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 11/642,676

(22) Filed: Dec. 21, 2006

(65) Prior Publication Data

US 2007/0149097 A1 Jun. 28, 2007

(30) Foreign Application Priority Data

Dec. 22, 2005 (JP) ............................. 2005-370535
Dec. 26, 2005 (JP) ............................. 2005-373088

(51) Int. Cl.
*C09C 1/68* (2006.01)
*C09K 3/14* (2006.01)
*B24D 3/02* (2006.01)

(52) U.S. Cl. ............................. 51/309; 51/293; 451/41

(58) Field of Classification Search ............... 51/293, 51/302, 309; 451/41; 541/41
See application file for complete search history.

(56) References Cited

U.S. PATENT DOCUMENTS

| 5,693,239 | A * | 12/1997 | Wang et al. ................ 216/88 |
| 5,997,620 | A * | 12/1999 | Kodama et al. .............. 106/3 |
| 6,068,769 | A | 5/2000 | Iio et al. |
| 6,126,514 | A * | 10/2000 | Muroyama .................. 451/36 |
| 6,752,692 | B2 * | 6/2004 | Wada et al. .................. 451/8 |
| 2001/0051746 | A1 * | 12/2001 | Hagihara et al. ............ 562/400 |
| 2001/0055937 | A1 * | 12/2001 | Wada et al. .................. 451/36 |
| 2002/0037642 | A1 * | 3/2002 | Wake et al. .................. 438/633 |
| 2002/0129559 | A1 * | 9/2002 | Ito et al. ........................ 51/307 |
| 2004/0123527 | A1 * | 7/2004 | Kitayama et al. ............. 51/307 |
| 2005/0032465 | A1 | 2/2005 | Fujii et al. |
| 2005/0136807 | A1 * | 6/2005 | Kitayama et al. ............ 451/41 |
| 2005/0194358 | A1 * | 9/2005 | Chelle .......................... 216/88 |
| 2005/0202670 | A1 * | 9/2005 | Shinmaru et al. ........... 438/626 |

FOREIGN PATENT DOCUMENTS

| GB | 2403725 A | | 1/2005 |
| JP | 2000-458 A | | 1/2000 |
| JP | 2003-197572 A | | 7/2003 |
| JP | 2003-218071 A | | 7/2003 |
| JP | 2005-63530 A | | 3/2005 |
| WO | WO 2005/007770 | * | 1/2005 |

OTHER PUBLICATIONS

Full English language translation of JP 2000-015560 (Jan. 18, 2000).

* cited by examiner

*Primary Examiner*—Anthony J Green
*Assistant Examiner*—Pegah Parvini
(74) *Attorney, Agent, or Firm*—Birch, Stewart, Kolasch & Birch, LLP

(57) ABSTRACT

The present invention preferably provides a polishing composition for a hard disk substrate, containing aluminum oxide particles and water, wherein secondary particles of the aluminum oxide particles have a volume-median particle size of from 0.1 to 0.7 μm, and particles having particle sizes of 1 μm or more of the aluminum oxide particles are contained in an amount of 0.2% by weight or less of the polishing composition; and a method for manufacturing a hard disk substrate using the polishing composition. By using the polishing composition and the method for manufacturing a substrate of the present invention, for example, a hard disk substrate suitable for high recording density can be provided in high productivity.

15 Claims, No Drawings

POLISHING COMPOSITION FOR HARD DISK SUBSTRATE

FIELD OF THE INVENTION

The present invention relates to a polishing composition for a hard disk substrate, and a method for manufacturing a hard disk substrate using the polishing composition.

BACKGROUND OF THE INVENTION

In recent memory hard disk drives, high storage capacity and miniaturization are in demand. In order to increase the recording density, it is desired to lower the flying height of a magnetic head and to reduce the unit recording area. Along with this trend, even in a manufacturing step for a substrate for a magnetic disk, the surface qualities of the substrate required after polishing have been severely assessed every year. In other words, in order to satisfy the lowering of the flying height of the magnetic head, surface roughness and microwaviness are required to be reduced. In order to meet such requirements, a polishing slurry capable of reducing scratches of a polished substrate is known (JP2000-15560 A and JP2000-458 A).

Moreover, recently, from the viewpoint of satisfying improvement in surface qualities such as an even higher smoothness and more reduced scratches, and increase in productivity, a multi-step polishing method including two or more steps of polishing steps has been employed (JP2005-63530 A). In a final polishing step of the multi-step polishing method, i.e. a finish-polishing step, in order to meet the requirements of reduction of surface roughness and reduction of scratches, polishing can be carried out with a polishing composition for finishing in which colloidal silica particles are used. On the other hand, in a polishing step prior to the finish-polishing step (rough-polishing step), abrasive grains having relatively larger particle sizes that are capable of realizing a high and practical polishing rate, for example aluminum oxide particles and the like are more likely to be used, from the viewpoint of productivity.

SUMMARY OF THE INVENTION

The present invention relates to:

[1] a polishing composition for a hard disk substrate, containing aluminum oxide particles and water, wherein secondary particles of the aluminum oxide particles have a volume-median particle size of from 0.1 to 0.7 μm, and particles having particle sizes of 1 μm or more of the aluminum oxide particles are contained in an amount of 0.2% by weight or less of the polishing composition;

[2] a method for manufacturing a hard disk substrate, including the step of polishing a substrate to be polished with the polishing composition as defined in the above [1]; and

[3] a method for manufacturing a magnetic disk substrate including the steps of:

rough-polishing a substrate using a polishing composition A containing aluminum oxide particles having an average secondary particle size ($D_{Al}$) of from 0.1 to 0.7 μm and an acid; and finish-polishing the substrate obtained in the rough-polishing step with a polishing composition B containing colloidal particles, wherein a polishing pressure P of the rough-polishing step satisfies the following formula (1):

$$74-(40 \times D_{Al}) \leq P \leq 138-(80 \times D_{Al}), \quad (1)$$

wherein $D_{Al}$ and P are expressed in units of μm and g/cm², respectively, and wherein a polished amount R of the finish-polishing step satisfies the following formula (2):

$$\{P \times (D_{Al})^2 + 10\} \times 0.01 \leq R \leq 0.5, \quad (2)$$

wherein R is expressed in the unit of μm; and $D_{Al}$, and P are as defined above.

DETAILED DESCRIPTION OF THE INVENTION

It has been clarified that when aluminum oxide particles are used as abrasive grains, the abrasive grains are more likely to be embedded into a substrate, and this embedding is a hindrance in improvement of the surface quality of a substrate. Specifically, it has been clarified that this embedding of the abrasive grains can lead to a defect in a recording medium as a texture scratch in a case where the embedding of the abrasive grains is not removed in a final finish-polishing step and remains on a substrate. Further, it has been clarified that when this embedding of the abrasive grains is likely to be strong, lowering in magnetic properties, in other words, lowering of the signal-to-noise ratio (SNR) may take place even if the embedding could have been removed in the final polishing step. In addition, even in a substrate for perpendicular magnetic recording (PMR) not subjected to a texture treatment, it has been found that the above-mentioned embedding of the abrasive grains can cause recording error, lowering of magnetic properties, lowering of SNR, or the like.

Accordingly, the present invention relates to a polishing composition containing aluminum oxide particles as abrasive grains, the polishing composition capable of realizing a practical polishing rate and reducing embedding of the aluminum oxide particles into a substrate; and a method for manufacturing a hard disk substrate.

When the polishing composition of the present invention is used, for example, for polishing before a finish polishing step of a hard disk substrate, an effect that a substrate having excellent surface qualities, which-has reduced embedding of aluminum oxide particles while having an economically advantageous polishing rate, can be manufactured is exhibited.

In addition, according to the present invention, a substrate with reduced embedding of aluminum oxide particles that can cause texture failure and head crashing can be obtained at a practical polishing rate. Therefore, effects that productivity and yield are increased in a media-manufacturing step, and that a flying height of a magnetic head is reduced can be exhibited.

These and other advantages of the present invention will be apparent from the following description.

In the present invention, the "embedding" of the abrasive grains refers to a state where the abrasive grains are pushed into a substrate and allowed to remain therein, different from the abrasive grains adhered on the substrate. This "embedding" can be evaluated by polishing in a smaller amount a substrate surface with a polishing composition containing colloidal particles as abrasive grains to remove abrasive grains adhered on the substrate, and thereafter observing the substrate surface with a dark-field microscope, or an atomic force microscope, or a scanning electron microscope (SEM) as detailed in Examples set forth below.

If the substrate is found to have embedding, it is considered that a defect is generated, such as deep scratches are formed on the surface in texturing which is carried out in the media-manufacturing step of a hard disk substrate, and that lowering of the magnetic properties, i.e. lowering of the signal-to-noise ratio (SNR) is caused in the completed hard disk. Therefore, the reduction of embedding of the abrasive grains is important for obtaining an excellent hard disk substrate.

The present invention has been accomplished on the basis of the findings that the particle size of the aluminum oxide particles is controlled to a specified size, and that the coarse particles having a specified size that are present in the abrasive grains are reduced to a specified level or lower, and whereby the embedding can be reduced.

One of the features of the polishing composition for a hard disk substrate in one embodiment of the present invention (Embodiment 1) resides in that a polishing composition for a hard disk substrate contains aluminum oxide particles and water, wherein secondary particles of the aluminum oxide particles have a volume-median particle size ($D_{50}$) of from 0.1 to 0.7 μm, and particles having particle sizes of 1 μm or more of the aluminum oxide particles are contained in an amount of 0.2% by weight or less of the polishing composition. By carrying out polishing with the polishing composition having the above features, the embedding of the aluminum oxide particles into a substrate can be remarkably reduced, whereby a hard disk substrate having excellent surface qualities can be provided with an economical polishing rate.

One of the features of a method for manufacturing a magnetic disk substrate in another embodiment (Embodiment 2) of the present invention resides in that the method includes the steps of:

rough-polishing a substrate using a polishing composition A containing aluminum oxide particles having an average secondary particle size ($D_{Al}$) of from 0.1 to 0.7 μm and an acid; and finish-polishing the substrate obtained in the rough-polishing step with a polishing composition B containing colloidal particles, wherein a polishing pressure P of the rough-polishing step satisfies the following formula (1):

$$74-(40 \times D_{Al}) \leq P \leq 138-(80 \times D_{Al}), \quad (1)$$

wherein $D_{Al}$ and P are expressed in units of μm and g/cm², respectively, and wherein a polished amount R of the finish-polishing step satisfies the following formula (2):

$$\{P \times (D_{Al})^2 + 10\} \times 0.01 \leq R \leq 0.5, \quad (2)$$

wherein R is expressed in the unit of μm; and $D_{Al}$ and P are as defined above.

Since the method for manufacturing a magnetic disk substrate of the present invention has the above feature, an effect that a substrate with reduced embedding of aluminum oxide particles possibly causing texture failure or head crashing can be obtained at a practical polishing rate, is exhibited.

<Aluminum Oxide Particles>

The polishing composition of Embodiment 1 and the polishing composition A of Embodiment 2 each contain aluminum oxide (hereinafter also referred to as alumina in some cases) as an abrasive. The aluminum oxide particles usable in the present invention is an alumina having a purity of preferably 95% or more, and more preferably 97% or more, and even more preferably 99% or more, from the viewpoint of reducing embedding, and from the viewpoint of reducing waviness, reducing surface roughness, increasing the polishing rate and preventing surface defects. In addition, α-alumina is preferable, from the viewpoint of increasing the polishing rate, and an intermediate alumina and an amorphous alumina are preferable from the viewpoint of surface properties and reduction in waviness. Here, the intermediate alumina used in the present invention is a generic term referring to crystalline alumina particles other than α-alumina particles. Specific examples thereof include γ-alumina, δ-alumina, θ-alumina, η-alumina, κ-alumina, mixtures thereof, and the like. Among the intermediate aluminas, γ-alumina, δ-alumina, θ-alumina, and mixtures thereof are preferable, and γ-alumina and θ-alumina are more preferable, from the viewpoint of increasing the polishing rate and reducing waviness. It is preferable to use a mixture of α-alumina and an intermediate alumina and/or an amorphous alumina, and it is more preferable to use a mixture of α-alumina and θ-alumina, from the viewpoint of increasing the polishing rate and reducing waviness. In addition, the α-alumina particles are contained in an amount of preferably 20% by weight or more, more preferably 30% by weight or more, even more preferably 40% by weight or more, and even more preferably 50% by weight or more, of the aluminum oxide particles, from the viewpoint of increasing the polishing rate and reducing waviness. In the present invention, the amount of the α-alumina particles contained in the aluminum oxide particles is obtained by calculating a peak area ascribed to α-alumina in X-ray diffraction, wherein a peak area of 104 face of WA-1000 (commercially available from Showa Denko K.K.) is defined as 100%.

The secondary particles of the aluminum oxide particles in the polishing composition of Embodiment 1 have a volume-median particle size of 0.7 μm or less, preferably 0.5 μm or less, more preferably 0.4 μm or less, even more preferably 0.35 μm or less, even more preferably 0.3 μm or less, and even more preferably 0.25 μm or less, from the viewpoint of reducing embedding of aluminum oxide particles, and from the viewpoint of reducing waviness and reducing surface roughness. Also, the secondary particles have a volume-median particle size of 0.1 μm or more, preferably 0.15 μm or more, and more preferably 0.2 μm, from the viewpoint of increasing polishing rate. In other words, the secondary particles have a volume-median particle size of from 0.1 to 0.7 μm, preferably from 0.1 to 0.5 μm, more preferably from 0.1 to 0.4 μm, even more preferably from 0.15 to 0.35 μm, even more preferably from 0.15 to 0.3 μm, and even more preferably from 0.2 to 0.25 μm. Among them, the secondary particles of the α-alumina particles have a volume-median particle size of preferably from 0.1 to 0.7 μm, more preferably from 0.1 to 0.5 μm, even more preferably from 0.1 to 0.4 μm, even more preferably from 0.1 to 0.35 μm, even more preferably from 0.15 to 0.3 μm, and even more preferably from 0.15 to 0.25 μm, from the viewpoint of reducing embedding of aluminum oxide particles, from the viewpoint of reducing waviness and reducing surface roughness, and from the viewpoint of increasing the polishing rate.

The aluminum oxide particles in the polishing composition A of Embodiment 2 have an average secondary particle size of 0.7 tm or less, preferably 0.6 μm or less, more preferably 0.5 μm or less, even more preferably 0.45 μm or less, and even more preferably from 0.4 μm or less, from the viewpoint of reducing embedding of aluminum oxide particles, and from the viewpoint of reducing waviness and reducing surface roughness. Also, the aluminum oxide particles have an average secondary particle size of 0.1 μm or more, preferably 0.15 μm or more, and more preferably 0.2 μm or more, from the viewpoint of increasing the polishing rate. In other words, the aluminum oxide particles usable in the polishing composition A have an average secondary particle size of from 0.1 to 0.7 μm, preferably from 0.1 to 0.6 μm, more preferably from 0.1 to 0.5 μm, even more preferably from 0.15 to 0.45 μm, and even more preferably from 0.2 to 0.4 μm. Among them, the α-aluminum oxide particles have an average secondary particle size of preferably from 0.1 to 0.7 μm, more preferably from 0.1 to 0.5 μm, even more preferably from 0.1 to 0.4 μm, even more preferably from 0.1 to 0.3 μm, even more preferably from 0.15 to 0.3 μm, and even more preferably from 0.15 to 0.25 μm, from the viewpoint of reducing embedding of aluminum oxide particles, from the viewpoint of reducing waviness and reducing surface roughness, and from the viewpoint of increasing the polishing rate.

The average secondary particle size of the aluminum oxide particles can be determined as a volume-average particle size using a laser beam diffraction method. Specifically, the secondary particle size can be, for example, determined by using a measurement equipment such as laser diffraction/scattering particle size analyzer LA920 (commercially available from Horiba, LTD.), laser diffraction-scattering type particle size distribution analyzer Microtrac HRA (commercially available from NIKKISO CO., LTD), laser diffraction type particle size distribution analyzer SALD-2100 (commercially available from Shimadzu Corporation), or the like.

The primary particles of the aluminum oxide particles in the polishing composition of Embodiment 1 and the polishing composition A of Embodiment 2 have an average particle size of preferably from 0.005 to 0.5 μm, more preferably from 0.01 to 0.4 μm, even more preferably from 0.03 to 0.3 μm, and even more preferably from 0.05 to 0.2 μm, from the viewpoint of reducing embedding of aluminum oxide particles and reducing waviness. Among them, the primary particles of the α-alumina particles have an average particle size of preferably from 0.05 to 0.5 μm, more preferably from 0.05 to 0.4 μm, even more preferably from 0.05 to 0.3 μm, and even more preferably from 0.07 to 0.2 μm, from the viewpoint of increasing the polishing rate, reducing waviness and reducing embedding of aluminum oxide particles.

The average particle size (on volume basis) of the primary particles and the volume-median particle size of the secondary particles having sizes of 0.1 μm or less of the abrasive can be obtained by subjecting the abrasive to an image analysis by observing with a scanning electron microscope in a magnification of preferably from 3,000 to 30,000 times, or with a transmission electron microscope in a magnification of preferably from 10,000 to 300,000 times, and determining the particle size. Specifically, a maximum length of individual primary particles and secondary particles was determined from an enlarged photograph or the like for at least 200 particles, and a volume of a sphere is calculated on the basis of its length as a diameter, and particle sizes ($D_{50}$) of which cumulative particle size distribution (on volume basis) is 50% counted from the side of a smaller particle size are respectively defined as an average particle size of the primary particles, or a volume-median particle size of the secondary particles. In addition, the volume-median particle size of the secondary particles having sizes exceeding 0.1 μm is determined for its particle size using a laser beam diffraction method.

The α-alumina has a specific surface area, as determined by a BET method, preferably from 0.1 to 50 m$^2$/g, more preferably from 1 to 40 m$^2$/g, and even more preferably from 2 to 20 m$^2$/g, from the viewpoint of increasing the polishing rate and reducing waviness. Further, the intermediate alumina or amorphous alumina has a specific surface area, as determined by a BET method, of preferably from 30 to 300 m$^2$/g, and more preferably from 50 to 200 m$^2$/g.

The aluminum oxide particles are contained in each of the polishing composition of Embodiment 1 and the polishing composition A of Embodiment 2 in an amount of preferably 0.05% by weight or more, more preferably 0.1% by weight or more, even more preferably 0.5% by weight or more, and even more preferably 1% by weight or more, from the viewpoint of increasing the polishing rate and reducing waviness. Also, the aluminum oxide particles are contained in each polishing composition in an amount of preferably 30% by weight or less, more preferably 20% by weight or less, even more preferably 15% by weight or less, and even more preferably 10% by weight or less, from the viewpoint of improving surface qualities and economic advantage. In other words, the aluminum oxide particles are contained in each polishing composition in an amount of preferably from 0.05 to 30% by weight, more preferably from 0.1 to 20% by weight, even more preferably from 0.5 to 15% by weight, and even more preferably from 1 to 10% by weight.

Coarse particles having particle sizes of 1 μm or more of the aluminum oxide particles in the polishing composition of Embodiment 1 are contained in an amount of 0.2% by weight or less, preferably 0.15% by weight or less, more preferably 0.1% by weight or less, and even more preferably 0.05% by weight or less, from the viewpoint of reducing embedding of aluminum oxide particles. In addition, coarse particles having particle sizes of 3 μm or more are contained in an amount of preferably 0.05% by weight or less, more preferably 0.04% by weight or less, even more preferably 0.03% by weight or less, even more preferably 0.02% by weight or less, and even more preferably 0.01% by weight or less, of the polishing composition, from the same viewpoint. Here, the phrases "coarse particles having particle sizes of 1 μm or more" or "coarse particles having particle sizes of 3 μm or more" are intended to include not only primary particles but also secondary particles formed by aggregation of primary particles.

In the present invention, particles having particle sizes of 1 μm or more of the overall aluminum oxide particles in the polishing composition A are contained in an amount of preferably 0.5% by weight or less, more preferably 0.3% by weight or less, even more preferably 0.2% by weight or less, even more preferably 0.15% by weight or less, even more preferably 0.1% by weight or less, and even more preferably 0.05% by weight or less, from the viewpoint of reducing embedding of alumina. Here, the phrase "coarse particles having particle sizes of 1 μm or more" is intended to include not only primary particles but also secondary particles formed by aggregation of primary particles.

In the determination of the amount of the above-mentioned coarse particles contained in the above-mentioned polishing composition, a sizing particle optical sensing method can be employed. For example, the amount of the coarse particles contained in the polishing composition can be obtained by determining a particle size of the abrasive with "Accusizer 780" commercially available from Particle Sizing Systems, USA, "Coulter Counter" commercially available from Coulter, or the like.

The method of controlling the amount of the coarse particles having particle sizes of 1 μm or/more of the aluminum oxide particles is not particularly limited, and a general dispersion or particle exclusion method can be used during the production or after the production of the above-mentioned polishing composition. For example, in order to have a specified average particle size or specified average particle size of secondary particles, the aluminum oxide particles can be produced by homogeneously disintegrating coarse particles with a wet-type circulating beads-mill to provide an aluminum oxide particle slurry, and further subjecting the slurry to a settling sedimentation method or a precipitation method with a centrifuge or the like, or to a precision filtration with a filtration material, thereby excluding coarse particles. Regarding the method of excluding coarse particles, the coarse particles may be treated with each of the methods alone, or a combination of two or more kinds of methods, and the order of the treatment of the combination is not limited by any way. Also, the treatment conditions and the number of treatments can also be appropriately selected and used.

<Water>

Water in each of the polishing composition of Embodiment 1 and the polishing composition A of Embodiment 2 is used as a medium, and ion-exchanged water, pure water, ultrapure water or the like can be used. The water is contained in an amount of preferably from 55 to 99% by weight, more preferably from 60 to 97% by weight, and even more preferably from 70 to 95% by weight, of the polishing composition, from the viewpoint of efficiently polishing an object to be polished.

<Acid>

It is preferable that each of the polishing composition of Embodiment 1 and the polishing composition A of Embodiment 2 further contains an acid, from the viewpoint of increasing the polishing rate and reducing waviness.

The acid that can be used in the present invention is an acid of which pK1 is preferably 7 or less, more preferably 5 or less, even more preferably 3 or less, and even more preferably 2 or less, from the viewpoint of increasing polishing rate and reducing waviness. Here, pK1 refers to a logarithmic value of an inverse of a first acid dissociation constant in a case where a logarithmic value of an inverse of an acid dissociation constant (25° C.) is expressed as pKa. The pK1 of each compound is listed in *Revised Fourth Edition, Kagaku Binran (Kiso-hen)* (*Chemistry Handbook (Fundamentals)*) II, 316-325 (Edited by Nihon Kagakukai) or the like.

Specific examples of the acids that can be used in the present invention are listed hereinbelow. The inorganic acid includes monovalent mineral acids such as nitric acid, hydrochloric acid, perchloric acid, and amide sulfuric acid; polyvalent mineral acids such as sulfuric acid, sulfurous acid, phosphoric acid, pyrophosphoric acid, polyphosphoric acid, phosphonic acid, and phosphinic acid. Also, the organic acid includes monocarboxylic acids such as formic acid, acetic acid, glycolic acid, lactic acid, propanoic acid, hydroxypropanoic acid, butyric acid, benzoic acid, and glycine; polycarboxylic acids such as oxalic acid, succinic acid, glutaric acid, adipic acid, maleic acid, fumaric acid, itaconic acid, malic acid, tartaric acid, citric acid, isocitric acid, phthalic acid, nitrotriacetic acid, and ethylenediaminetetraacetic acid; alkyl sulfonic acids such as methanesulfonic acid and paratoluenesulfonic acid; alkyl phosphates such as ethyl phosphate and butyl phosphate; phosphonic acids such as phosphonohydroxyacetic acid, hydroxyethylidenediphosphonic acid, phosphonobutanetricarboxylic acid, and ethylenediaminetetramethylenephosphonic acid; and the like. Among them, the polyvalent acids are preferable, and polyvalent mineral acids, polyvalent organic carboxylic acids, and polyvalent organic phosphonic acids are more preferable, and the polyvalent mineral acids and the polyvalent organic carboxylic acids are even more preferable, from the viewpoint of increasing the polishing rate and reducing waviness. Here, the polyvalent acid refers to an acid having two or more hydrogen atoms in its molecule that are capable of generating a hydrogen ion. In addition, nitric acid, sulfuric acid, sulfonic acids and carboxylic acids are preferable, from the viewpoint of preventing the surface of an object to be polished from being stained.

The above-mentioned acid may be used alone, and it is preferable to use the acids in admixture of two or more kinds. Especially, in a case where a metal surface such as a Ni—P plated substrate is polished, when the metal ions are eluted from the object to be polished during polishing so that a pH of the above-mentioned polishing composition is elevated, and a high polishing rate cannot be obtained, it is preferable to use a combination of an acid having a pK1 of less than 2.5 and an acid having a pK1 of 2.5 or more, and a combination of an acid having a pK1 of 1.5 or less and an acid having a pK1 of 2.5 or more is more preferable, in order to make a pH change small. When two or more kinds of these acids are contained as mentioned above, as the acid having a pK1 of less than 2.5, it is preferable to use a mineral acid such as nitric acid, sulfuric acid, phosphoric acid, or polyphosphoric acid, an organic phosphonic acid, or an organic sulfonic acid, in consideration of an increase in the polishing rate, reduction in waviness and availability. On the other hand, as the acid having a pK1 of 2.5 or more, an organic carboxylic acid such as acetic acid, succinic acid, malic acid, tartaric acid, citric acid or itaconic acid is preferable, among which succinic acid, malic acid, tartaric acid, citric acid or itaconic acid is preferable, and citric acid is more preferable, from the same viewpoint. In addition, when an organic carboxylic acid having a pK1 of 2.5 or more is used, it is more preferable to use an oxycarboxylic acid and a dicarboxylic or higher polycarboxylic acid in combination, from the viewpoint of increasing the polishing rate and reducing waviness. The oxycarboxylic acid includes, for example, citric acid, malic acid, tartaric acid, and the like. The polycarboxylic acid includes, for example, succinic acid, maleic acid, itaconic acid, and the like. Therefore, it is preferable that one or more of these acids are used in combination, among which a combination of citric acid and a polycarboxylic acid is preferable.

The above acid is contained in each of the polishing composition of Embodiment 1 and the polishing composition A of Embodiment 2 in an amount of preferably 0.002% by weight or more, more preferably 0.005% by weight or more, even more preferably 0.007% by weight or more, and even more preferably 0.01% by weight or more, from the viewpoint of increasing the polishing rate and reducing waviness. In addition, the acid is contained in an amount of preferably 20% by weight or less, more preferably 15% by weight or less, even more preferably 10% by weight or less, and even more preferably 5% by weight by weight or less, of the polishing composition, from the viewpoint of surface qualities and economic advantage. In other words, the acid is contained in the polishing composition in an amount of preferably from 0.002 to 20% by weight, more preferably from 0.005 to 15% by weight, even more preferably 0.007 to 10% by weight, and even more preferably from 0.01 to 5% by weight. In addition, a weight ratio of the acid having a pK1 of less than 2.5 to the acid having a pK1 of 2.5 or more, i.e. (acid having a pK1 of less than 2.5)/(acid having a pK1 of 2.5 or more), is preferably from 9/1 to 1/9, more preferably from 7/1 to 1/7, and even more preferably from 5/1 to 1/5, from the viewpoint of increasing the polishing rate.

<Oxidizing Agent>

It is preferable that each of the polishing composition of Embodiment 1 and the polishing composition A of Embodiment 2 contains an oxidizing agent, from the viewpoint of increasing the polishing rate and reducing waviness. Although the mechanism of polishing is not fully elucidated, it is presumed that the polishing effectiveness of the alumina is changed to a sufficiently exhibiting level due to the action of the oxidizing agent to an object to be polished. The oxidizing agent usable in the present invention includes peroxides, peroxo acids of metals or salts thereof, oxyacids or salts thereof, nitrates, sulfates, metal salts of acids, and the like. The oxidizing agents are roughly classified into inorganic oxidizing agents and organic oxidizing agents based on their structures. Specific examples of those oxidizing agents are listed hereinbelow. As the inorganic oxidizing agent, hydrogen peroxide; a peroxide of an alkali metal or an alkaline earth metal, such as sodium peroxide, potassium peroxide, calcium peroxide, barium peroxide, or magnesium peroxide; a peroxocarbonate such as sodium peroxocarbonate or potassium peroxocarbonate; a peroxosulfuric acid or a salt thereof, such as ammonium peroxodisulfate, sodium peroxodisulfate, potassium peroxodisulfate, or peroxomonosulfuric acid; a peroxonitric acid or a salt thereof, such as peroxonitric acid, sodium peroxonitrate, or potassium peroxonitrate; peroxophosphoric acid or a salt thereof, such as sodium peroxophosphate, potassium peroxophosphate, or ammonium peroxophosphate; a peroxoborate such as sodium peroxoborate or potassium peroxoborate; a peroxochromate such as potassium peroxochromate or sodium peroxochromate; a permanganate such as potassium permanganate or sodium permanganate; a halogeno-acid or a derivative thereof, such as sodium perchlorate, potassium perchlorate, chloric acid, sodium hypochlorite, sodium periodate, potassium periodate, iodic acid, or sodium iodate; or an inorganic metal salt, such as iron (III) chloride or iron (III) sulfate can be used. As the organic oxidizing agent, a percarboxylate such as peracetic acid, performic acid, or perbenzoic acid; a peroxide such as t-butyl peroxide or cumene peroxide; or iron (III) citrate can be used. Among them, the inorganic oxidizing agents are preferable, when an increase in polishing rate, availability, and handling property such as water solubility are compared. Further, an inorganic peroxide not containing a heavy metal is preferred, in consideration of environmental issues. In addition, hydrogen peroxide, a peroxosulfate, or a halogeno-acid or a derivative thereof is more preferable, and hydrogen peroxide is even more preferable, from the viewpoint of preventing the surface of a substrate to be polished from being stained. Also, these peroxides may be used alone, or in admixture of two or more kinds.

The oxidizing agent is contained in each of the polishing composition of Embodiment 1 and the polishing composition A of Embodiment 2 in an amount of preferably 0.002% by weight or more, more preferably 0.005% by weight or more, even more preferably 0.007% by weight or more, and even more preferably 0.01% by weight or more, from the viewpoint of increasing polishing rate and reducing waviness. Also, the oxidizing agent is contained in the polishing composition in an amount of preferably 20% by weight or less, more preferably 15% by weight or less, even more preferably 10% by weight or less, and even more preferably 5% by weight or less, from the viewpoint of surface qualities and economic advantages. In other words, the oxidizing agent is contained in the polishing composition in an amount of preferably from 0.002 to 20% by weight, more preferably from 0.005 to 15% by weight, even more preferably from 0.007 to 10% by weight, and even more preferably from 0.01 to. 5% by weight.

In addition, in each of the polishing composition of Embodiment 1 and the polishing composition A of Embodiment 2, other components can be further formulated for the purposes of improving polishing rate, reducing waviness, and other purposes. Other components include, for example, metal oxide abrasives such as colloidal silica, fumed silica, and colloidal titanium oxide; inorganic salts, thickening agents, anticorrosive agents, basic substances, and the like. Examples of the inorganic salt include ammonium nitrate, ammonium sulfate, potassium sulfate, nickel sulfate, aluminum nitrate, aluminum sulfate, ammonium sulfamate, and the like. The inorganic salt can be used for the purposes of increasing polishing rate, improving roll-off, preventing caking phenomenon of the polishing composition, and the like.

The above-mentioned other components may be used alone, or in admixture of two or more kinds. The other components are contained in the polishing composition in an amount of preferably from 0.05 to 20% by weight, more preferably from 0.05 to 10% by weight, and even more preferably from 0.05 to 5% by weight, from the viewpoint of economic advantages.

Further, as other components, a disinfectant, an antibacterial agent or the like can be optionally formulated. The disinfectant or the antibacterial agent is contained in each of the polishing composition of Embodiment 1 and the polishing composition A of Embodiment 2 in an amount of preferably from 0.0001 to 0.1% by weight, more preferably from 0.001 to 0.05% by weight, and even more preferably from 0.002 to 0.02% by weight, from the viewpoint of exhibiting their functions, and from the viewpoint of their influences to the polishing properties and economic advantages.

Here, the concentration of each of the above-mentioned components in each of the polishing composition of Embodiment 1 and the polishing composition A of Embodiment 2 is a preferred concentration upon polishing, which may be a concentration upon production of the polishing composition. The polishing composition is usually produced as a concentrate and diluted before use or upon use in many cases.

In addition, the polishing composition can be produced by adding and mixing the desired components in a given method.

It is preferable that a pH of each of the polishing composition of Embodiment 1 and the polishing composition A of Embodiment 2 is properly determined depending upon the kinds and required qualities and the like of an object to be polished. For example, the polishing composition has a pH of preferably less than 7, more preferably from 0.1 to 6, even more preferably from 0.5 to 5, even more preferably from 1 to 5, even more preferably from 1 to 4, and even more preferably from 1 to 3, from the viewpoint of increasing polishing rate and reducing waviness, and from the viewpoint of anticorrosion of processing machine and safety of an operator. The pH can be adjusted by properly formulating with a desired amount of an inorganic acid such as nitric acid or sulfuric acid; an organic acid such as an oxycarboxylic acid, a polycarboxylic acid, an aminopolycarboxylic acid, or an amino acid; a metal salt thereof; an ammonium salt thereof; a basic substance such as ammonia, sodium hydroxide, potassium hydroxide, or amine as occasion demands.

By using each of the polishing composition of Embodiment 1 and the polishing composition A of Embodiment 2, embedding of abrasive grains to a substrate is remarkably reduced, so that a hard disk substrate suitable for high recording density can be provided.

<Method for Manufacturing Substrate (Embodiment 1)>

The method for manufacturing a hard disk substrate of the present invention includes the step of polishing a substrate to be polished with a polishing composition of Embodiment 1 mentioned above (hereinafter also referred to as "step of polishing").

The hard disk substrate, that is a substrate to be polished to which the present invention is subjected, refers to those used as a substrate for a medium for magnetic recording. Specific examples of the magnetic disk substrate are representatively a substrate in which an aluminum alloy is plated with a Ni-P alloy, and also include a substrate in which glass or glassy carbon is used in place of the aluminum alloy, and plated with a Ni-P alloy; or a substrate coated with various metal compounds by means of plating or vapor deposition in place of plating with Ni—P.

In "the step of polishing" mentioned above, a substrate to be polished can be polished by pressing a substrate against platens to which a porous, organic polymer polishing pad is attached, feeding the polishing composition of Embodiment 1 to a surface of the substrate to be polished, and polishing the substrate to be polished while moving the polishing platens or the substrate while applying pressure. Therefore, the present invention relates to a method including the step of polishing a substrate to be polished with the above-mentioned polishing composition. The polishing pressure upon polishing is preferably from 1 to 20 kPa, more preferably from 2 to 15 kPa, even more preferably from 3 to 10 kpa, and even more preferably from 4 to 8 kPa, from the viewpoint of reducing embedding of aluminum oxide particles into a substrate, and from the viewpoint of productivity (polishing rate). Other polishing conditions (kinds of polishing machines, polishing temperature, polishing rate, flow rate of a polishing composition, and the like) are not particularly limited.

The method for manufacturing a substrate in Embodiment 1 is preferably a multi-step polishing method including two or more polishing steps, and it is preferable that the above "step of polishing" is carried out in a step prior to a finish polishing step, which is a final step. In the polishing composition used in the finish-polishing step, the primary particles of the polishing particles have an average particle size of preferably 0.1 µm or less, more preferably 0.08 µm or less, even more preferably 0.05 µm or less, and even more preferably 0.03 µm or less, from the viewpoint of surface qualities of a hard disk substrate, for example, from the viewpoint of reducing waviness, reducing surface roughness, and reducing surface defects such as scratches. Also, the primary particles have an average particle size of preferably 0.005 µm or more, and more preferably 0.01 µm or more, from the viewpoint of increasing the polishing rate.

The polishing particles in the polishing composition of Embodiment 1 used in the finish polishing step include fumed silica abrasive grains, colloidal silica abrasive grains, and the like, and colloidal silica abrasive grains are preferable, from the viewpoint of reducing surface roughness and reducing surface defects such as scratches. The primary particles of the colloidal silica abrasive grains have an average particle size of preferably from 0.005 to 0.08 µm, more preferably from 0.005 to 0.05 µm, and even more preferably from 0.01 to 0.03 µm.

In the finish-polishing step, when polishing particles of which primary particles have an average particle size of from 0.005 to 0.1 µm are used, the polished amount is preferably from 0.05 to 0.5 µm, more preferably from 0.1 to 0.4 µm, and even more preferably from 0.2 to 0.4 µm, from the viewpoint of reducing surface roughness and reducing embedding of aluminum oxide, and from the viewpoint of productivity (polishing time). When finish-polishing is carried out, other conditions (kinds of polishing machines, polishing temperature, polishing rate, flow rate of the polishing composition, and the like) are not particularly limited. The polishing pressure may be the same as the polishing pressure exemplified in the "step of polishing" mentioned above. Here, the polished amount can be obtained in accordance with the method described in Examples set forth below.

The polishing composition of the present invention is even more effective in the polishing step, and the polishing composition can be similarly applied to grinding steps other than this step, for example, the lapping step, and the like.

Since the hard disk substrate obtained by using the method for manufacturing a substrate of the present invention has remarkably reduced embedding of the aluminum oxide particles, the hard disk substrate is suitable for high recording density.

<Method for Manufacturing Substrate (Embodiment 2)>

Rough-Polishing Step

<Polishing Method>

In the rough-polishing step, a substrate can be polished by pressing a substrate against platens to which a porous, organic polymer polishing pad is attached, feeding a polishing composition A to a surface of the substrate to be polished, and polishing the substrate to be polished with moving the polishing platens or the substrate while applying a pressure.

<Polishing Pressure P>

In the present invention, the magnetic disk substrate is manufactured through the steps of subjecting a substrate to a rough-polishing step, and further subjecting the substrate obtained in a rough-polishing step to a finish-polishing step. The polishing pressure P is a polishing pressure in the rough-polishing step, and that the average secondary particle size of the aluminum oxide particles satisfies the following formula (1):

$$74-(40 \times D_{Al}) \leq P \leq 138-(80 \times D_{Al}), \tag{1}$$

wherein $D_{Al}$ and P are expressed in units of µm and g/cm², respectively, and it is preferable that the average secondary particle size satisfies the following formula (3):

$$74-(40 \times D_{Al}) \leq P \leq 128-(80 \times D_{Al}), \tag{3}$$

wherein $D_{Al}$ and P are as defined above, and it is more preferable that the average secondary particle size satisfies the following formula (4):

$$74-(40 \times D_{Al}) \leq P \leq 125-(80 \times D_{Al}), \tag{4}$$

wherein $D_{Al}$ and P are as defined above, when the aluminum oxide particles have an average secondary particle size ($D_{Al}$) falling within the range of from 0.1 to 0.7 µm, from the viewpoint of productivity for its lower limit, and from the viewpoint of reducing embedding of alumina particles for its upper limit.

Since the relationship of a polishing pressure P and an average secondary particle size of the aluminum oxide particles satisfies the above formula, a high polishing rate and reduction in embedding of polishing particles can be both satisfied. In the polishing rate and the embedding of the polishing particles, it is considered that a pressure applied to individual aluminum oxide particles is related. In addition, since it is expected that the embedding of the polishing particles is not only dependent on the above pressure but also on a particle size of the aluminum oxide particles, it is considered that qualitatively the larger the value of $D_{Al}$, the smaller the tolerated polishing pressure from the viewpoint of inhibiting embedding of polishing particles. Based on the examination as described above and the obtained experimental results, a conclusion can be drawn that when a polishing pressure satisfies the above formula, embedding of the polishing particles can be inhibited while keeping an economically advantageous polishing rate.

<Other Polishing Conditions>

A thickness of a substrate removed by rough-polishing, i.e. a polished amount in the rough-polishing step is preferably from 1 to 3 µm, and more preferably from 1 to 2 µm, per single side of a substrate, from the viewpoint of reducing waviness and removing plating defects or the like while maintaining productivity. Other polishing conditions (kinds of polishing machines, polishing temperature, polishing rate, flow rate, of a polishing composition A, and the like) are not particularly limited.

<Substrate>

A substrate to be polished in the present invention is a magnetic disk substrate used as a substrate for a medium for magnetic recording. Specific examples of the magnetic disk substrate are the same as above.

Polishing Composition B

<Colloidal Particles>

The colloidal particles contained in the polishing composition B include colloidal particles of metal oxides, and include, for example, colloidal silica particles, colloidal ceria particles, colloidal alumina particles, and the like, and the colloidal silica particles are more preferable. The colloidal silica particles can be obtained by, for example, a method including the step of generating colloidal silica particles from an aqueous silicic acid solution. In addition, those obtained by surface-modifying or surface-improving these colloidal particles with a functional group, those formed into composite particles of the colloidal particles together with a surfactant or another abrasive, and the like can also be used.

The primary particles of the colloidal particles have an average particle size of preferably from 1 to 50 nm, from the viewpoint of reducing scratches and from the viewpoint of reducing surface roughness (average surface roughness: Ra, peak-to-valley value: Rmax). Simultaneously, the primary particles of the colloidal particles have an average particle size of more preferably from 3 to 50 nm, even more preferably from 5 to 40 nm, and even more preferably from 5 to 30 nm, from the viewpoint of increasing the polishing rate.

The average particle size of the primary particles of the colloidal particles can be determined from an observed image with a transmission electron microscope (TEM).

The colloidal particles are contained in the polishing composition B upon use in an amount of preferably 0.5% by weight or more, more preferably 1% by weight or more, even more preferably 3% by weight or more, even more preferably 5% by weight or more, from the viewpoint of increasing the polishing rate. Also, the colloidal particles are contained in the polishing composition B in an amount of preferably 20% by weight or less, more preferably 15% by weight or less, even more preferably 13% by weight or less, and even more preferably 10% by weight or less, from the viewpoint of economically improving the surface qualities. Therefore, the colloidal particles are contained in the polishing composition B in an amount of preferably from 0.5 to 20% by weight, more preferably from 1 to 15% by weight, even more preferably from 3 to 13% by weight, and even more preferably from 5 to 10% by weight, from the viewpoint of increasing the polishing rate, and at the same time economically improving the surface qualities. The amount of the colloidal particles contained may be either an amount of the colloidal particles contained during production of the polishing composition, or an amount of the colloidal particles contained upon use. The colloidal particles are usually produced as a concentrate and diluted upon use in many cases.

The colloidal particles having particle sizes of from 5 to 100 nm are contained in the colloidal particles in an amount of preferably 50% by volume or more, and more preferably 55% by volume or more, from the viewpoint of reducing micropits, surface roughness, and scratches. In addition, colloidal particles having smaller particle sizes of 5 nm or more and less than 40 nm are contained in the colloidal particles having particle sizes of from 5 to 100 nm in an amount of from 10 to 70% by volume, more preferably from 15 to 65% by volume, and even more preferably from 20 to 60% by volume, from the viewpoint of removability of embedding of alumina particles and reduction of micropits for its lower limit, and from the viewpoint of inhibiting vibration during polishing and carrier squeals for its upper limit. Here, the above-mentioned "colloidal particles having particle sizes of from 5 to 100 nm" is intended to include not only primary particles but also secondary particles in which the primary particles are aggregated.

The particle size and the particle size distribution of the above colloidal particles can be determined as follows. Specifically, the photographs of the colloidal particles observed by a transmission electron microscope "JEM-2000 FX" commercially available from JEOL LTD. at an acceleration voltage of 80 kV and a magnification of 10,000 to 50,000 are incorporated into a personal computer as image data with a scanner connected thereto. The projected area diameter (diameter of a circle having the same area as a projected area of the colloidal particles) of each colloidal particle is determined using an image analysis software "WinROOF" (commercially available from MITANI CORPORATION), and considered as a diameter of the colloidal particles. After analyzing data for 1,000 or more colloidal particles, the volume of the colloidal particles are calculated from the diameters of the colloidal particles based on the analyzed data using a spreadsheet software "EXCEL" (commercially available from Microsoft Corporation). Next, a ratio (% based on volume) of particles having sizes of 5 nm or more and 100 nm or less in the entire particles is calculated, and a ratio (% based on volume) of a region of particles having sizes of 5 nm or more and less than 40 nm in the entire group of particles having sizes of 5 nm or more and 100 nm or less is obtained.

<Water>

The water usable in the polishing composition B includes ion-exchanged water, distilled water, ultrapure water, and the like. The amount of water contained corresponds to the balance resulting from subtracting the colloidal particles and other components from 100% by weight, and the water is contained in the polishing composition B in an amount of preferably from 60 to 99% by weight, and more preferably from 80 to 97% by weight.

The polishing composition B has a pH of preferably from 0.1 to 7. Under acidic conditions, generation of scratches is remarkably inhibited as compared to those under alkaline conditions. Although the mechanism of generating scratches is not elucidated, it is presumably due to the fact that under alkaline atmosphere where the polishing particles strongly repel against each other by surface charges, a local pressure is more likely to be applied under polishing pressure to an aggregate of the abrasive primary particles or coarse abrasive primary particles contained in the polishing composition B without making them closely packed in the polishing portion. The pH is preferably determined depending upon the kinds of an object to be polished and required properties. When a material of an object to be polished is a metal material, the polishing composition B has a pH of preferably 6 or less, more preferably 5 or less, and even more preferably 4 or less, from the viewpoint of increasing the polishing rate. In addition, the polishing composition B has a pH of preferably 0.5 or more, more preferably 1 or more, and even more preferably 1.4 or more, from the viewpoint of influences on human bodies and prevention of corrosion of the polishing machine. Even more, in a substrate for a precision part in which a material for an object to be polished is a metal material, as in the case of a nickel-phosphorus (Ni—P)-plated aluminum alloy substrate, the polishing composition B has a pH of preferably from 0.5 to 6, more preferably from 1.0 to 5, and even more preferably from 1.4 to 4, in consideration of the above viewpoint.

The pH can be adjusted with an acid or a salt given hereinbelow. Specific examples include inorganic acids, such as nitric acid, sulfuric acid, nitrous acid, persulfuric acid, hydrochloric acid, perchloric acid, phosphoric acid, phosphonic acid, phosphinic acid, pyrophosphoric acid, tripolyphosphoric acid, and amide sulfuric acid, or salts thereof; organic phosphonic acids, such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, and α-methylphosphonosuccinic acid, or salts thereof; aminocarboxylic acids, such as glutamic acid, picolinic acid, and aspartic acid, or salts thereof; carboxylic acids, such as oxalic acid, nitroacetic acid, maleic acid, and oxaloacetic acid, or salts thereof; and the like. Among them, the inorganic acids, the organic phosphonic acids, and salts thereof are preferable, from the viewpoint of reducing scratches.

In addition, among the inorganic acid or salts thereof, nitric acid, sulfuric acid, hydrochloric acid, perchloric acid, or salts thereof are more preferable; among the organic phosphonic acid or salts thereof, 1-hydroxyethylidene-1,1-diphosphonic acid, aminotri(methylenephosphonic acid), ethylenediaminetetra(methylenephosphonic acid), diethylenetriaminepenta(methylenephosphonic acid), or salts thereof are more preferable. These acids or salts thereof may be used alone or in admixture of two or more kinds.

The counterion (cation) for forming salts thereof is not particularly limited. Specific examples thereof include metal ions, ammonium ions, and alkylammonium ions forming salts thereof. Specific examples of the metal include a metal belonging to Group 1A, 1B, 2A, 2B, 3A, 3B, 4A, 6A, 7A, or 8 of the Periodic Table (long period form). The ammonium ion or the metal ion belonging to Group 1A is preferable, from the viewpoint of reducing scratches.

<Other Components>

In addition, in the polishing composition B, other components can be optionally formulated. Other components include, for example, thickening agents, dispersants, anticorrosive agents, basic substances, surfactants, and the like. In addition, although the other components cannot be unconditionally limited because they vary depending upon the material of an object to be polished, in general, in a metal material, an oxidizing agent can be added from the viewpoint of increasing the polishing rate. The oxidizing agent includes hydrogen peroxide, permanganic acid, chromic acid, nitric acid, peroxo acid, an oxyacid, or salts thereof, a metal oxide salt, and the like. The above other components are contained in an amount of preferably from 0.001 to 10% by weight, and more preferably from 0.01 to 5% by weight of the polishing composition B.

The polishing composition B having the constitution as mentioned above can be prepared by mixing each of the above components by a known method.

Finish-Polishing Step

<Polishing Method>

In the finish-polishing step using the above-mentioned polishing composition B, a substrate obtained in the rough-polishing step can be polished by a polishing method similar to that of the rough-polishing step.

<Polished Amount R>

A polished amount R (μm) in the finish-polishing step satisfies the following formula (2):

$$\{P\times(D_{Al})^2+10\}\times 0.01 \leq R \leq 0.5, \quad (2)$$

wherein $D_{Al}$, P and R are expressed in units of μm, g/cm², and μm, respectively, from the viewpoint of removing embedding of alumina particles for its lower limit, and from the viewpoint of productivity and economic advantage for its upper limit, and it is preferable that a polished amount R (μm) satisfies the following formula (5):

$$\{P\times(D_{Al})^2+10\}\times 0.013 \leq R \leq 0.5, \quad (5)$$

wherein $D_{Al}$, P and R are as defined above, from the viewpoint of removing residual stress layer, and it is more preferable that a polished amount R (μm) satisfies the following formula (6):

$$\{P\times(D_{Al})^2+10\}\times 0.015 \leq R \leq 0.5, \quad (6)$$

wherein $D_{Al}$, P and R are as defined above.

Here, a residual stress layer refers to a layer having compression residual stress generated by polishing in the direction of the depth from a surface of a substrate. When the residual stress layer remains on a polished substrate, in a step of manufacturing a magnetic disk substrate, texture would be ununiform, or the stress is released by a thermal treatment such as sputtering, so that surface smoothness of a substrate may be worsened in some cases, whereby there are some risks of lowering performance and productivity of a magnetic disk.

The lower limit of the finish-polished amount is defined by a function of the product of a pressure of a rough-polishing step and the square of the particle size of the alumina particles, but the reasons are not elucidated in detail. When a most close-packed model assuming that the alumina particles are spherical is considered, a force applied to a single particle in the rough-polishing step is expressed as a function of a pressure and the square of a particle size. On the other hand, it is considered that embedding of the alumina particles is proportional to a force applied to a single particle. Therefore, since it is necessary to remove embedding of the alumina particles by finish-polishing, it is considered that a removal amount of the finish-polishing step is defined by the function expressed as the formula mentioned above. The upper limit of the finish-polished amount is 0.5 μm or less, from the viewpoint of production efficiency.

<Polishing Conditions>

The polishing pressure in the finish-polishing step is preferably from 20 to 150 g/cm² (2.0 to 14.7 kPa), more preferably from 40 to 130 g/cm² (3.9 to 12.7 kPa), and even more preferably from 50 to 120 g/cm² (4.9 to 11.8 kPa), from the viewpoint of removing residual stress layer by the colloidal particles, and productivity (polishing rate). When finish-polishing is carried out, other conditions (kinds of polishing machines, polishing temperature, rotational speed of platen, flow rate of the polishing composition B, polishing time, and the like) are not particularly limited.

According to the method for manufacturing a magnetic disk substrate of the present invention, a substrate having reduced embedding of aluminum oxide particles which can cause texture failure or head crashing is provided. Accordingly, effects of increasing yield in a media-manufacturing step and lowering the flying height of a magnetic head can be exhibited.

EXAMPLES

The following examples further describe and demonstrate embodiments of the present invention. The examples are given solely for the purposes of illustration and are not to be construed as limitations of the present invention.

Examples of Embodiment 1

1. Preparation of Polishing Composition (Embodiment 1)
Each of the polishing compositions of Examples 1 to 7 and Comparative Examples 1 to 4 was prepared in the following manner.
(1) Nitric acid was added to 50 kg of an aluminum oxide slurry containing 10% by weight of aluminum oxide particles having a purity of 99.9% shown in Table 1 to adjust the pH of the slurry to 3.
(2) The aluminum oxide slurry obtained in (1) was transferred to a cylindrical vessel having a diameter of 40 cm and a height of 50 cm.
(3) The aluminum oxide slurry inside the vessel was stirred to be homogeneous.
(4) The aluminum oxide slurry after stirring was allowed to stand for 3 to 10 hours.
(5) After allowing the aluminum oxide slurry to stand, an upper layer portion of the slurry was transferred to another vessel of the same shape, leaving about 5 cm of a lower layer portion thereof.
(6) The above procedural steps (3) to (5) were repeated for an additional 2 to 4 times, to provide an aluminum oxide slurry from which various coarse particles were removed.
(7) Various additives were added to the aluminum oxide slurry obtained in (6) so as to have each composition as shown in Table 2, and ion-exchanged water was formulated as the balance while stirring.
(8) The slurry obtained in (7) was filtered with a bag filter (commercially available from Hayward Filtration, Japan, model number: PE1-P03H-403), to provide a polishing composition.

2. Polishing Method
Surfaces of a Ni—P plated aluminum alloy substrate having a thickness of 1.27 mm, and a diameter of 3.5 inch (95 mm) (short-wavelength waviness: 3.8 nm and long-wavelength waviness: 1.6 nm, as determined by "Zygo New View 5032") were polished, using a double-sided processing machine under the following setting conditions, to provide a polished object, a Ni—P plated aluminum alloy substrate usable as a substrate for a magnetic recording medium.
The setting conditions for the double-sided processing machine are as follows.

<Setting Conditions for Double-Sided Processing Machine]
Double-sided processing machine: Model 9B, commercially available from SPEEDFAM CO., LTD.
Polishing pressure: 9.8 kPa
Polishing pad: commercially available from FUJIBO, a polishing pad for 1P (1st
Polish: rough-polishing step), average pore size: 45 μm
Rotational speed of a platen: 50 r/min.
Flow rate for a polishing composition: 100 mL/min
Polishing time period: 4 min.
Number of substrates introduced: 10

3. Evaluation Methods
(1) Polishing Rate
Weights of each substrate before and after polishing were measured using a device commercially available from Sartorius under the trade name of "BP-210S." The change in weight of each substrate was obtained, and an average of the change of 10 substrates was referred to as an amount reduced, and a value obtained by dividing the amount reduced by the polishing time is referred to as a rate of weight reduced. The rate of weight reduced is introduced into the following equation and converted to a polishing rate (μm/min). Here, a relative value of a polishing rate (relative rate) for each of Examples and Comparative Examples was obtained, assuming that the polishing rate of Comparative Example 1 takes a standard value of 100. The results are shown in Table 3.

Rate of Weight Reduced (g/min)=[Weight Before Polishing (g)−Weight After Polishing (g)]/Polishing Time (min)

Polishing Rate (μm/min)=Rate of Weight Reduced (g/min)/Area of Single Side of Substrate (mm$^2$)/Ni—P Plating Density (g/cm$^3$)×10$^6$ (2) Waviness
Two pieces of substrates were selected from 10 polished substrates, and waviness was determined at two points of 180 degrees intervals on both sides of each selected substrate (total of 8 points) under the following conditions. An average of 8 points of determined values was calculated as a short-wavelength waviness or a long-wavelength waviness of a substrate. Here, a relative value of waviness of a substrate in each of Examples and Comparative Examples was obtained, assuming that waviness of a substrate of Comparative Example 1 takes a standard value of 100. The results are shown in Table 3.

| | |
|---|---|
| Equipment: | "Zygo New View 5032" |
| Object Lens: | Magnification, 2.5 times, Michelson |
| Zooming Ratio: | 0.5 |
| Remove: | Cylinder |
| Filter: | FFT Fixed Band Pass |
| Short-Wavelength Waviness: | 50 to 500 μm |
| Long-Wavelength Waviness: | 0.5 to 5 mm |
| Area: | 4.33 mm × 5.77 mm |

(3) Determination of Content of Coarse Particles
The content of coarse particles was determined under the following determination conditions. The results are shown in Table 3.
Measuring Instrument: "Accusizer 780APS," commercially available from Particle Sizing Systems (PSS)
Injection Loop Volume: 1 mL
Flow Rate: 60 mL/min.
Data Collection Time: 60 sec.
Number Channels: 128

(4) Determination of Volume-Median Particle Size of Secondary Particles A volume-median particle size (D50), D10 and D90 were determined under the following determination conditions. The results are shown in Tables 1 and 3.
Measuring Instrument: commercially available from Horiba, LTD., laser diffraction/scattering particle size distribution analyzer LA920
Circulation Intensity: 4
Ultrasonication Intensity: 4

(5) Content of α-Alumina Particles

Twenty grams of a polishing composition prepared in 1. above was dried at 105° C. for 5 hours, to provide a powder. Thereafter, a peak area at 104 face was determined with an X-ray diffractometer (model number: RINT2500VPC, commercially available from Rigaku Corporation (formerly Rigaku Denki)) at a tube voltage of 40 kW and a tube electric current of 120 mA. The peak area at 104 face of the α-alumina particles was relatively compared with that obtained from a peak area of WA-1000 (commercially available from Showa Denko K.K.) in the same manner as above to obtain the content of the α-alumina particles. The results are shown in Table 3.

Content of α-Alumina Particles (% by weight)=(Peak Area of Test Sample)÷(Peak Area of WA-1000)×100

(6) Evaluation of Embedding of Abrasive Grains

The embedding of the abrasive grains was evaluated by observing a substrate surface after polishing the surface of a polished substrate obtained by the polishing method in 2. above with a polishing composition given below so as to have a polished amount of 0.05 μm±0.005 μm. The compositions of the polishing compositions, the polishing conditions, the method for determining polished amount, and a method for observing embedding are given hereinbelow.

<Polishing Composition>

A polishing composition containing a colloidal silica slurry (commercially available from DuPont, average particle size of primary particles: 0.02 μm) in an amount of 7% by weight as a silica particle concentration, HEDP (1-hydroxyethylidene-1,1-diphosphonic acid, commercially available from SOLUTIA, JAPAN INC.) in an amount of 2% by weight as an active ingredient, hydrogen peroxide (commercially available from ASAHI DENKA KOGYO K.K.) in an amount of 0.6% by weight as an active ingredient, and balance ion-exchanged water was used.

<Polishing Conditions>

Polishing test machine: double-sided polishing machine Model 9B, commercially available from SPEEDFAM CO., LTD.
Polishing pad: commercially available from FUJIBO, a pad for finish-polishing made of urethane
Rotational speed of an upper platen: 32.5 r/min.
Flow rate for a polishing composition: 100 mL/min
Polishing time period: 0.5 to 2 min. (adjusted so that the polished amount was 0.05 μm±0.005 μm)
Polishing pressure: 7.8 kPa
Number of substrates introduced: 10

<Polished Amount>

Weights of each substrate before and after polishing were determined with "BP-210S" commercially available from Sartorius, and the weights were introduced into the following formulas, to obtain a polished amount.

Weight Reduction (g)={[Weight Before Polishing (g)]−[Weight After Polishing (g)]}

Polished Amount (μm)=[Weight Reduction (g)]/ [[Area of Single Side of Substrate (mm$^2$)/2]× [Ni—P Plating Density (g/cm$^3$)]]×10$^6$ wherein an area of a single side of a substrate was calculated as 6597 mm$^2$, and Ni—P plating density was calculated as 8.4 g/cm$^3$.

<Observation of Embedding>

Dark-field observation (field: 100×75 μm) was carried out using a microscope commercially available from Olympus Corporation (formerly Olympus Optical, Co., Ltd.) (main body: BX60M, digital camera: DP70, objective lens: 100 times, and intermediate lens: 2.5 times).

The above observation was made by arbitrarily selecting two pieces of substrates out of 10 polished substrate, and observed for bright spots on 4 points per side, positioned 30 mm away from the center, the 4 points being at an interval of 90 degrees each for both sides of two substrates, totaling 16 points. An average of the number of observed bright spots is defined as the number of embedding of abrasive grains.

The embedding of the abrasive grains was evaluated on the bases of the number of embedding of the abrasive grains observed by the above-mentioned embedding observation, and the following evaluation criteria. The results are shown in Table 3.

<Evaluation Criteria for Embedding>

5: the number of embedding of the abrasive grains being 100 or more;
4: the number of embedding of the abrasive grains being from 30 to 99;
3: the number of embedding of the abrasive grains being from 10 to 29;
2: the number of embedding of the abrasive grains being from 5 to 9; and
1: the number of embedding of the abrasive grains being from 0 to 4.

TABLE 1

| Abrasive Grain No. | Aluminum Oxide Particles Crystal Form | Before Treatment of Removing Coarse Particles | | After Treatment of Removing Coarse Particles | |
|---|---|---|---|---|---|
| | | Average Primary Particle Size (μm) | Volume-Median Particle Size of Secondary Particles $D_{50}^{1)}$(μm) | Average Primary Particle Size (μm) | Volume-Median Particle Size of Secondary Particles $D_{50}^{1)}$(μm) |
| No. 1 | α-Alumina | 0.15 | 0.50 | 0.14 | 0.40 |
| No. 2 | α-Alumina | 0.10 | 0.35 | 0.10 | 0.29 |
| No. 3 | α-Alumina | 0.10 | 0.25 | 0.10 | 0.20 |
| No. 4 | θ-Alumina | 0.02 | 0.20 | 0.02 | 0.20 |
| No. 5 | α-Alumina | 0.15 | 0.60 | Untreated | |
| No. 6 | α-Alumina | 0.10 | 0.35 | Untreated | |

TABLE 1-continued

|  |  | Before Treatment of Removing Coarse Particles | | After Treatment of Removing Coarse Particles | |
| --- | --- | --- | --- | --- | --- |
| Abrasive Grain No. | Aluminum Oxide Particles Crystal Form | Average Primary Particle Size (μm) | Volume-Median Particle Size of Secondary Particles $D_{50}^{1)}$ (μm) | Average Primary Particle Size (μm) | Volume-Median Particle Size of Secondary Particles $D_{50}^{1)}$ (μm) |
| No. 7 | α-Alumina | 0.10 | 0.25 | Untreated | |
| No. 8 | α-Alumina | 0.15 | 0.80 | Untreated | |

[1)] $D_{50}$ refers to a particle size at 50% counted from a smaller particle size side of the cumulative particle size distribution (on volume basis).

TABLE 2

| | Formulated Composition (balance being ion-exchanged water and nitric acid) | | | | | |
| --- | --- | --- | --- | --- | --- | --- |
| | Aluminum Oxide | | Acid having pK1 <2.5 | Acid having pK1 ≧2.5 | Oxidizing Agent | Other Additives |
| Ex. 1 | No. 3 (3% by wt.) | No. 4 (2% by wt.) | Sulfuric Acid (0.5% by wt.) | Citric Acid (0.6% by wt.) | Hydrogen Peroxide (0.6% by wt.) | Ammonium Sulfate (0.5% by wt.) |
| Ex. 2 | No. 2 (3% by wt.) | No. 4 (2% by wt.) | Sulfuric Acid (0.5% by wt.) | Citric Acid (0.6% by wt.) | Hydrogen Peroxide (0.6% by wt.) | Ammonium Sulfate (0.5% by wt.) |
| Ex. 3 | No. 1 (4% by wt.) | No. 4 (1% by wt.) | Sulfuric Acid (0.5% by wt.) | Citric Acid (0.6% by wt.) | Hydrogen Peroxide (0.6% by wt.) | Ammonium Sulfate (0.5% by wt.) |
| Ex. 4 | No. 1 (5% by wt.) | — | Sulfuric Acid (0.5% by wt.) | Citric Acid (0.6% by wt.) | Hydrogen Peroxide (0.6% by wt.) | Ammonium Sulfate (0.5% by wt.) |
| Ex. 5 | No. 3 (4% by wt.) | No. 4 (2% by wt.) | — | Citric Acid (0.5% by wt.) | Hydrogen Peroxide (0.6% by wt.) | — |
| Ex. 6 | No. 1 (4% by wt.) | No. 4 (1% by wt.) | Polyphosphoric Acid (0.02% by wt.) | Citric Acid (0.5% by wt.) Itaconic Acid (0.1% by wt.) | — | — |
| Ex. 7 | No. 1 (6% by wt.) | No. 4 (2% by wt.) | — | Citric Acid (0.3% by wt.) | — | Trisodium Citrate (0.2% by wt.) |
| Comp. Ex. 1 | No. 5 (3% by wt.) | — | Polyphosphoric Acid (0.02% by wt.) | Citric Acid (0.5% by wt.) Itaconic Acid (0.1% by wt.) | — | — |
| Comp. Ex. 2 | No. 7 (4% by wt.) | — | Sulfuric Acid (0.5% by wt.) | Citric Acid (0.6% by wt.) | Hydrogen Peroxide (0.6% by wt.) | Ammonium Sulfate (0.5% by wt.) |
| Comp. Ex. 3 | No. 6 (3% by wt.) | No. 4 (2% by wt.) | — | Citric Acid (0.3% by wt.) | — | Trisodium Citrate (0.2% by wt.) |
| Comp. Ex. 4 | No. 8 (2% by wt.) | — | Polyphosphoric Acid (0.02% by wt.) | Citric Acid (0.5% by wt.) Itaconic Acid (0.1% by wt.) | — | — |

TABLE 3

| | Volume-Based Particle Size[1)] of Secondary Particles of Aluminum Oxide | | | Content of 1 μm or more Particles (% by wt.) | Content of 3 μm or more Particles (% by wt.) | Content of α-Alumina in Aluminum Oxide (% by wt.) | pH of Polishing Composition | Evaluation of Embedding | Polishing Rate (Relative Rate) | Short-Wavelength Waviness (Relative Value) |
| --- | --- | --- | --- | --- | --- | --- | --- | --- | --- | --- |
| | $D_{10}$ | $D_{50}$ | $D_{90}$ | | | | | | | |
| Ex. 1 | 0.14 | 0.21 | 0.33 | 0.04 | 0.004 | 40 | 1.8 | 1 | 130 | 45 |
| Ex. 2 | 0.16 | 0.25 | 0.35 | 0.05 | 0.006 | 41 | 1.8 | 1 | 150 | 50 |
| Ex. 3 | 0.25 | 0.38 | 0.57 | 0.10 | 0.021 | 71 | 1.8 | 2 | 180 | 65 |
| Ex. 4 | 0.27 | 0.40 | 0.60 | 0.14 | 0.032 | 90 | 1.8 | 2 | 140 | 90 |
| Ex. 5 | 0.15 | 0.22 | 0.34 | 0.05 | 0.005 | 45 | 3.5 | 1 | 105 | 40 |
| Ex. 6 | 0.25 | 0.38 | 0.57 | 0.10 | 0.021 | 71 | 2.6 | 2 | 100 | 70 |
| Ex. 7 | 0.26 | 0.39 | 0.59 | 0.09 | 0.020 | 67 | 6.0 | 2 | 100 | 75 |
| Comp. Ex. 1 | 0.37 | 0.60 | 1.05 | 0.3 | 0.071 | 92 | 2.6 | 5 | 100 | 100 |
| Comp. Ex. 2 | 0.17 | 0.25 | 0.39 | 0.31 | 0.065 | 67 | 1.8 | 4 | 100 | 70 |
| Comp. Ex. 3 | 0.23 | 0.34 | 0.56 | 0.29 | 0.060 | 40 | 6.0 | 4 | 85 | 65 |
| Comp. Ex. 4 | 0.45 | 0.81 | 1.45 | 2.50 | 0.82 | 93 | 2.6 | 5 | 85 | 120 |

[1)] $D_{10}$, $D_{50}$, and $D_{90}$ refer to particle sizes at 10%, 50%, and 90%, respectively, counted from a smaller particle side of the cumulative particle size distribution (on volume basis), wherein $D_{50}$ is a volume-median particle size.

It can be seen from Table 3 that the substrates obtained in Examples 1 to 7 have remarkably reduced embedding of the abrasive grains into the substrate, as compared to the substrates obtained in Comparative Examples 1 to 4.

Examples of Embodiment 2

Examples 8 to 15, and Comparative Examples 5 to 13

(1) Preparation of Polishing Composition A A polishing composition A was prepared in the following manner.
(1) Nitric acid was added to 50 kg of an aluminum oxide slurry containing 10% by weight of aluminum oxide particles having a purity of 99.9% shown in Table 4 to adjust the pH of the slurry to 3.
(2) The aluminum oxide slurry obtained in (1) was transferred to a cylindrical vessel having a diameter of 40 cm and a height of 50 cm.
(3) The aluminum oxide slurry inside the vessel was stirred to be homogeneous.
(4) The aluminum oxide slurry after stirring was allowed to stand for 3 to 10 hours.
(5) After allowing the aluminum oxide slurry to stand, an upper layer portion of the slurry was transferred to another vessel of the same shape, leaving about 5 cm of a lower layer portion thereof.
(6) The above procedural steps (3) to (5) were repeated for an additional 2 to 4 times, to provide an aluminum oxide slurry from which various coarse particles were removed.
(7) Various additives were added to the aluminum oxide slurry obtained in (6) so as to have each composition as shown in Table 5, and ion-exchanged water was formulated as the balance while stirring.
(8) The slurry obtained in (7) was filtered with a bag filter (commercially available from Hayward Filtration, Japan, model number: PE1-P03H-403), to provide a polishing composition A.

2. Preparation of Polishing Composition B

A colloidal silica slurry (commercially available from DuPont, average particle size of primary particles: 0.02 μm) as colloidal particles in an amount of 7% by weight as a silica particle concentration, HEDP (1-hydroxyethylidene-1,1-diphosphonic acid, commercially available from SOLUTIA, JAPAN INC.) in an amount of 2% by weight as an active ingredient, hydrogen peroxide (commercially available from ASAHI DENKA KOGYO K.K.) in an amount of 0.6% by weight as an active ingredient, and balance ion-exchanged water were mixed together, to provide a polishing composition B.

3. Polishing Method

Surfaces of a Ni-P plated aluminum alloy substrate having a thickness of 1.27 mm, and a diameter of 3.5 inch (95 mm) (short-wavelength waviness: 3.8 nm and long-wavelength waviness: 1.6 nm, as determined by "Zygo New View 5032") were polished, using a double-sided processing machine under the following setting conditions, sequentially in order of rough-polishing and finish-polishing, to provide a polished object, a Ni-P plated aluminum alloy substrate usable as a substrate for a magnetic recording medium. Here, the polished amounts of rough-polishing and finish-polishing were adjusted by the polishing time.

The setting conditions for the double-sided processing machine are as follows.

<Polishing Conditions (Rough-Polishing Step)>
Polishing test machine: double-sided polishing machine Model 9B, commercially available from SPEEDFAM CO., LTD.
Polishing pressure: listed in Table 5
Polishing pad: commercially available from FUJIBO, a pad for rough-polishing, average pore size: 45 μm
Rotational speed of a platen: 50 r/min.
Flow rate for a polishing composition: 100 mL/min
Polishing time period: listed in Table 5 (time required for polished amount of 1.6 μm)
Number of substrates introduced: 10

<Polishing Conditions (Finish-Polishing Step)>
Polishing test machine: double-sided polishing machine Model 9B, commercially available from SPEEDFAM CO., LTD.
Polishing pad: commercially available from FUJIBO, a pad for finish-polishing made of urethane, average pore size: 20 μm
Rotational speed of a platen: 32.5 r/min.
Flow rate for a polishing composition: 100 mL/min
Polishing time period: listed in Table 5
Polishing pressure: 80 g/cm$^2$ (7.8 kPa)
Number of substrates introduced: 10

4. Evaluation Methods (Rough-Polishing Step)

(i) Polishing Rate

Weights of each substrate before and after polishing were measured using a device commercially available from Sartorius under the trade name of "BP-210S." The change in weight of each substrate was obtained, and an average of the change of 10 substrates was referred to as an amount reduced, and a value obtained by dividing the amount reduced by the polishing time was referred to as a rate of weight reduced. Here, a relative value of a polishing rate (relative rate) for each of Examples and Comparative Examples was obtained, assuming that the polishing rate of Comparative Example 5 takes a standard value of 100.

Polishing Rate (mg/min)=[Weight Before Polishing (mg)−Weight After Polishing (mg)]/Polishing Time (min)

(ii) Determination of Average Secondary Particle Size of Aluminum Oxide Particles The average secondary particle size was determined under the following determination conditions. The results are shown in Tables 4 and 5.
Measuring Instrument: commercially available from Horiba, LTD., laser diffraction/scattering particle size distribution analyzer LA920
Circulation Intensity: 4
Ultrasonication Intensity: 4

(iii) Determination of Content of Coarse Particles

The content of coarse particles in the polishing composition A was determined under the same determination conditions as the determination of the content of coarse particles in the above (3) of Embodiment 1. The results are shown in Table 5.

(iv) Evaluation of Embedding of Polishing Particles

A substrate surface after finish-polishing was observed in the following manner.

<Polished Amount (Finish-Polishing Step)>

A polished amount was obtained by weighing each substrate before and after finish-polishing were measured using a device commercially available from Sartorius under the trade name of "BP-210S," and introducing the weights into the following formulas, to obtain a polished amount.

Weight Reduction (g)={[Weight Before Polishing (g)]−[Weight After Polishing (g)]}

Polished Amount (μm)=[Weight Reduction (g)]/ [[Area of Single Side of Substrate (mm$^2$)/2]× [Ni—P Plating Density (g/cm$^3$)]]×10$^6$ wherein an area of a single side of a substrate was calculated as 6597 mm$^2$, and Ni—P plating density was calculated as 7.9 g/cm$^3$.

<Observation of Embedding>

Dark-field observation (field: 550×420 μm) was carried out using a microscope commercially available from Olympus Corporation (formerly Olympus Optical, Co., Ltd.) (main body: BX60M, digital camera: DP70, objective lens: 20 times, and intermediate lens: 2.5 times).

The above observation was made by selecting a piece of substrate, and observed for bright spots on 4 points per side, positioned 30 mm away from the center, the 4 points being at an interval of 90 degrees each for both sides of one substrate, totaling 8 points. An average of the number of observed bright spots is converted to the number per 1 mm2, and evaluated as embedding of the polishing particles. The results are shown in Table 5.

TABLE 4

| Aluminum Oxide Slurry No. | Aluminum Oxide Particles | | After Treatment of Removing Coarse Particles |
|---|---|---|---|
| | Crystal Form | Average Secondary Particle Size (μm) | Average Secondary Particle Size (μm) |
| A | α-Alumina | 0.67 | 0.60 |
| B | α-Alumina | 0.42 | 0.35 |
| C | α-Alumina | 0.25 | 0.20 |
| D | θ-Alumina | 0.20 | 0.20 |
| E | α-Alumina | 0.80 | Untreated |
| F | α-Alumina | 0.25 | Untreated |

TABLE 5

| | Rough-Polishing | | | | | |
|---|---|---|---|---|---|---|
| | Formulation Components[1),2)] of Polishing Composition A | | Average Secondary Particle Size ($D_{Al}$) (μm) | Content of 1 μm or more Particles (% by wt.) | Polishing Pressure P[6)] (g/cm$^2$) | Polishing Rate (Relative Rate) |
| | Aluminum Oxide | Other Additives | | | | |
| Ex. 8 | A(3%) | D(2%) | C(0.5%), I(0.1%), P(0.02%) | 0.58 | 0.31 | 80 (7.8) | 100 |
| Ex. 9 | A(3%) | D(2%) | C(0.5%), I(0.1%), P(0.02%) | 0.58 | 0.31 | 60 (5.9) | 80 |
| Ex. 10 | B(3%) | D(2%) | C(0.5%), I(0.1%), P(0.02%) | 0.32 | 0.05 | 100 (9.8) | 81 |
| Ex. 11 | B(3%) | D(2%) | C(0.6%), S(0.5%), A(0.5%), HP(0.6%) | 0.32 | 0.05 | 100 (9.8) | 138 |
| Ex. 12 | B(3%) | D(2%) | C(0.6%), S(0.5%), A(0.5%), HP(0.6%) | 0.32 | 0.05 | 80 (7.8) | 125 |
| Ex. 13 | C(3%) | D(2%) | C(0.6%), S(0.5%), A(0.5%), HP(0.6%) | 0.21 | 0.05 | 110 (10.8) | 102 |
| Ex. 14 | B(5%) | — | C(0.6%), S(0.5%), A(0.5%), HP(0.6%) | 0.35 | 0.07 | 100 (9.8) | 102 |
| Ex. 15 | F(3%) | D(2%) | C(0.6%), S(0.5%), A(0.5%), HP(0.6%) | 0.24 | 0.70 | 110 (10.8) | 106 |
| Comp. Ex. 5 | A(3%) | D(2%) | C(0.5%), I(0.1%), P(0.02%) | 0.58 | 0.31 | 80 (7.8) | 100 |
| Comp. Ex. 6 | A(3%) | D(2%) | C(0.5%), I(0.1%), P(0.02%) | 0.58 | 0.31 | 120 (11.8) | 120 |
| Comp. Ex. 7 | A(3%) | D(2%) | C(0.5%), I(0.1%), P(0.02%) | 0.58 | 0.31 | 40 (3.9) | 48 |
| Comp. Ex. 8 | C(3%) | D(2%) | C(0.6%), S(0.5%), A(0.5%), HP(0.6%) | 0.21 | 0.05 | 140 (13.7) | 124 |
| Comp. Ex. 9 | E(3%) | D(2%) | C(0.5%), I(0.1%), P(0.02%) | 0.80 | 2.00 | 70 (6.9) | 61 |
| Comp. Ex. 10 | C(3%) | D(2%) | C(0.6%), S(0.5%), A(0.5%), HP(0.6%) | 0.21 | 0.05 | 50 (4.9) | 47 |
| Comp. Ex. 11 | B(3%) | D(2%) | C(0.6%), S(0.5%), A(0.5%), HP(0.6%) | 0.32 | 0.05 | 130 (12.7) | 152 |
| Comp. Ex. 12 | A(3%) | D(2%) | C(0.5%), I(0.1%), P(0.02%) | 0.58 | 0.31 | 80 (7.8) | 100 |
| Comp. Ex. 13 | B(3%) | D(2%) | C(0.6%), S(0.5%), A(0.5%), HP(0.6%) | 0.32 | 0.05 | 80 (7.8) | 125 |

| | Finish-Polishing | Time Required for Polishing | | | | Values from Formulas | | |
|---|---|---|---|---|---|---|---|---|
| | Polished Amount R (μm) | Rough-Polishing (minute) | Finish-Polishing (minute) | Total (minute) | Evaluation of Embedding (number/mm$^2$) | Formula (1) Lower Limit[3)] | Formula (1) Upper Limit[4)] | Formula (2) Lower Limit[5)] |
| Ex. 8 | 0.41 | 4.2 | 6.3 | 10.5 | 0.9 | 51 | 92 | 0.37 |
| Ex. 9 | 0.34 | 5.0 | 5.4 | 10.4 | 0.4 | 51 | 92 | 0.30 |
| Ex. 10 | 0.26 | 5.0 | 4.4 | 9.3 | 0.0 | 61 | 112 | 0.20 |
| Ex. 11 | 0.26 | 3.3 | 4.4 | 7.7 | 0.4 | 61 | 112 | 0.20 |
| Ex. 12 | 0.38 | 3.6 | 6.0 | 9.5 | 0.0 | 61 | 112 | 0.18 |
| Ex. 13 | 0.24 | 4.1 | 4.1 | 8.3 | 0.0 | 66 | 121 | 0.15 |
| Ex. 14 | 0.30 | 4.1 | 4.9 | 9.0 | 0.4 | 60 | 110 | 0.22 |
| Ex. 15 | 0.22 | 4.0 | 3.9 | 7.9 | 2.2 | 64 | 119 | 0.16 |

TABLE 5-continued

| | | | | | | | | |
|---|---|---|---|---|---|---|---|---|
| Comp. Ex. 5 | 0.19 | 4.2 | 3.5 | 7.7 | 10.0 | 51 | 92 | 0.37 |
| Comp. Ex. 6 | 0.52 | 3.7 | 7.8 | 11.4 | 7.8 | 51 | 92 | 0.50 |
| Comp. Ex. 7 | 0.30 | 7.7 | 4.9 | 12.6 | 2.6 | 51 | 92 | 0.23 |
| Comp. Ex. 8 | 0.21 | 3.6 | 3.7 | 7.3 | 5.2 | 66 | 121 | 0.16 |
| Comp. Ex. 9 | 0.48 | 6.2 | 7.2 | 13.5 | 12.1 | 42 | 74 | 0.50 |
| Comp. Ex. 10 | 0.22 | 7.8 | 3.9 | 11.7 | 0.1 | 66 | 121 | 0.12 |
| Comp. Ex. 11 | 0.52 | 3.1 | 7.8 | 10.9 | 2.8 | 61 | 112 | 0.23 |
| Comp. Ex. 12 | 0.55 | 4.2 | 8.1 | 12.3 | 0.1 | 51 | 92 | 0.37 |
| Comp. Ex. 13 | 0.11 | 3.6 | 2.4 | 6.0 | 3.1 | 61 | 112 | 0.18 |

[1] Percentage inside parenthesis shows a content of each component (% by weight) as an effective ingredient of the polishing composition, the balance being ion-exchanged water and nitric acid.
[2] The abbreviations for the other additives are as follows: C: citric acid, I: itaconic acid, P: polyphosphoric acid, S: sulfuric acid, A: ammonium sulfate, HP: hydrogen peroxide.
[3] $74 - (40 \times D_{Al})$
[4] $138 - (80 \times D_{Al})$
[5] $\{P \times (D_{Al})^2 + 10\} \times 0.01$
[6] Number inside the parenthesis is expressed by the unit of kPa.

It can be seen from Table 5 that the method for manufacturing a substrate of the present invention can accomplish both reduced embedding of polishing particles into a substrate and high polishing rate.

By using the polishing composition and the method for manufacturing a substrate of the present invention, for example, a hard disk substrate suitable for high recording density can be provided in high productivity.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition for a Ni—P plated aluminum alloy hard disk substrate, comprising aluminum oxide particles and water, wherein secondary particles of the aluminum oxide particles have a volume-median particle size of from 0.15 to 0.7 μm, the aluminum oxide particles comprise 40% to 90% or by weight of α-alumina particles, and particles of the α-alumina particles having particle sizes of 1 μm or more are contained in an amount of 0.04% to 0.2% by weight of the polishing composition;
    wherein the polishing composition results in reduced embedding, an improved polishing rate and/or an improved short-wavelength waviness.

2. The polishing composition according to claim 1, wherein the aluminum oxide particles comprise 40 to 45% by weight of α-alumina particles.

3. The polishing composition according to claim 2, wherein primary particles of the α-alumina particles have an average particle size of from 0.05 to 0.5 μm.

4. The polishing composition according to claim 1, wherein the polishing composition has a pH of from 0.1 to 6.

5. The polishing composition according to claim 2, wherein the polishing composition has a pH of from 0.1 to 6.

6. The polishing composition according to claim 3, wherein the polishing composition has a pH of from 0.1 to 6.

7. The polishing composition according to claim 1, wherein particles of the aluminum oxide particles having particle sizes of 3 μm or more are contained in an amount of 0.004% to 0.032% by weight of the polishing composition.

8. A polishing composition for a Ni—P plated aluminum alloy hard disk substrate, comprising aluminum oxide particles and water, wherein secondary particles of the aluminum oxide particles have a volume-median particle size of from 0.15 to 0.7 μm, the aluminum oxide particles comprise 40% to 90% by weight of α-alumina particles, and particles of the α-alumina particles having a particle size of 1 μm or more are contained in an amount of 0.04% to 0.2% by weight of the composition, and particles of the α-alumina particles having a particle size of 3 μm or more are contained in an amount of 0.004 to 0.05% by weight of the composition;
    wherein the polishing composition results in reduced embedding, an improved polishing rate and/or an improved short-wavelength waviness.

9. The polishing composition according to claim 8, wherein the aluminum oxide particles comprise 40 to 45% by weight of α-alumina particles.

10. The polishing composition according to claim 9, wherein primary particles of the α-alumina particles have an average particle size of from 0.05 to 0.5 μm.

11. The polishing composition according to claim 8, wherein the polishing composition has a pH of from 0.1 to 6.

12. The polishing composition according to claim 9, wherein the polishing composition has a pH of from 0.1 to 6.

13. The polishing composition according to claim 10, wherein the polishing composition has a pH of from 0.1 to 6.

14. The polishing composition according to claim 8, wherein particles of the α-alumina particles having particle sizes of 3 μm or more are contained in an amount of 0.004% to 0.032% by weight of the polishing composition.

15. The polishing composition according to claim 8, wherein said polishing composition further comprises sulfuric acid, citric acid, hydrogen peroxide and ammonium sulfate.

* * * * *